(12) United States Patent
Park et al.

(10) Patent No.: US 8,892,301 B2
(45) Date of Patent: Nov. 18, 2014

(54) APPARATUS AND METHOD FOR CONTROLLING HEAD LAMP OF VEHICLE

(71) Applicant: SL Corporation, Daegu (KR)

(72) Inventors: Jong Ryoul Park, Gyeongsan (KR); Young Ho Son, Gyeongsan (KR)

(73) Assignee: SL Corporation, Daegu (KR)

( * ) Notice: Subject to any disclaimer, the term of this patent is extended or adjusted under 35 U.S.C. 154(b) by 127 days.

(21) Appl. No.: 13/676,823

(22) Filed: Nov. 14, 2012

(65) Prior Publication Data

US 2013/0128599 A1   May 23, 2013

(30) Foreign Application Priority Data

Nov. 18, 2011 (KR) .................. 10-2011-0121145

(51) Int. Cl.
*B60Q 1/08* (2006.01)

(52) U.S. Cl.
CPC  *B60Q 1/08* (2013.01); *B60Q 1/085* (2013.01); *B60Q 2300/056* (2013.01); *B60Q 2300/312* (2013.01); *B60Q 2300/332* (2013.01); *B60Q 2300/334* (2013.01); *B60Q 2300/41* (2013.01); *B60Q 2300/42* (2013.01)
USPC .............. 701/36; 701/49; 362/459; 362/464; 362/465; 362/466

(58) Field of Classification Search
USPC ............. 701/49, 36, 408, 523, 519; 362/459, 362/464, 465, 466
See application file for complete search history.

(56) References Cited

U.S. PATENT DOCUMENTS

| | | | | |
|---|---|---|---|---|
| 5,182,502 A * | 1/1993 | Slotkowski et al. | .......... | 315/159 |
| 7,156,542 B2 * | 1/2007 | Miller et al. | .......... | 362/466 |
| 7,429,825 B2 * | 9/2008 | Kubota et al. | .......... | 315/82 |
| 7,690,826 B2 * | 4/2010 | Kim | .......... | 362/545 |
| 8,308,327 B2 * | 11/2012 | Lee et al. | .......... | 362/539 |
| 8,487,535 B2 * | 7/2013 | Tani et al. | .......... | 315/82 |
| 8,552,648 B2 * | 10/2013 | Hayakawa | .......... | 315/82 |
| 2002/0080618 A1 * | 6/2002 | Kobayashi et al. | .......... | 362/466 |
| 2003/0123705 A1 * | 7/2003 | Stam et al. | .......... | 382/104 |
| 2004/0114379 A1 * | 6/2004 | Miller et al. | .......... | 362/464 |
| 2007/0002571 A1 * | 1/2007 | Cejnek et al. | .......... | 362/460 |

(Continued)

FOREIGN PATENT DOCUMENTS

| | | |
|---|---|---|
| DE | 102008060949 A1 | 9/2009 |
| EP | 1491402 A2 | 12/2004 |

(Continued)

OTHER PUBLICATIONS

Lachmayer et al., From AFS to Assistive Headlamps, 2006, Hella KGaA Hueck & Co.).*

(Continued)

*Primary Examiner* — Thomas G Black
*Assistant Examiner* — Sara Nelson
(74) *Attorney, Agent, or Firm* — Edwards Wildman Palmer LLP; Kongsik Kim

(57) ABSTRACT

An apparatus and a method for controlling a head lamp of a vehicle are disclosed. The apparatus includes one or more processors configured to: determine whether at least one of a low beam and a high beam is turned on; select at least one of a plurality of pieces of control information for controlling an illumination pattern according to the determination result; and control the illumination pattern according to the selected control information.

20 Claims, 16 Drawing Sheets

(56) References Cited

U.S. PATENT DOCUMENTS

| | | |
|---|---|---|
| 2008/0002420 A1* | 1/2008 | Lambert et al. ............... 362/543 |
| 2008/0192496 A1* | 8/2008 | Mochizuki et al. ........... 362/466 |
| 2008/0246404 A1* | 10/2008 | Shelton et al. .................. 315/82 |
| 2009/0010494 A1* | 1/2009 | Bechtel et al. ................ 382/104 |
| 2011/0012511 A1* | 1/2011 | Watanabe ....................... 315/82 |
| 2011/0260618 A1 | 10/2011 | Mueller et al. |
| 2011/0317439 A1* | 12/2011 | Yamazaki et al. ............ 362/465 |
| 2012/0051071 A1* | 3/2012 | Okubo et al. ................. 362/465 |
| 2012/0123638 A1* | 5/2012 | Bechtel et al. ................. 701/36 |
| 2012/0203432 A1* | 8/2012 | Lukacs et al. .................. 701/42 |

FOREIGN PATENT DOCUMENTS

| | | |
|---|---|---|
| GB | 2347996 A | 9/2000 |
| JP | 2011-016504 A | 1/2011 |
| KR | 10-2003-0041256 A | 5/2003 |

OTHER PUBLICATIONS

European Search Report dated Apr. 4, 2014 in connection with European Application No. 12007771.4.

* cited by examiner

APPARATUS AND METHOD FOR CONTROLLING HEAD LAMP OF VEHICLE

CROSS-REFERENCE TO RELATED APPLICATIONS

This application claims priority from Korean Patent Application No. 10-2011-0121145 filed on Nov. 18, 2011, the entire contents of which are incorporated herein by reference.

BACKGROUND OF THE INVENTION

1. Field of the Invention

The present invention relates to an apparatus and method for controlling a head lamp of a vehicle, and more particularly, to an apparatus and method for controlling a head lamp of a vehicle, that can control an illumination pattern based on the control information varying according to the beam irradiation direction.

2. Description of the Related Art

In general, a vehicle includes automotive lamps with a lighting function enabling a driver to easily recognize objects around the vehicle at night or in dark lighting and a signaling function for informing a driver of another vehicle or a pedestrian of a traveling state of the vehicle.

For example, a head lamp and a fog light are designed for a lighting function, and a blinker, a tail lamp, a stop lamp and a side marker are designed for a signaling function.

Specifically, a head lamp for a vehicle provides a function of ensuring a driver's view at night or in dark lighting by irradiating light in the same direction as a traveling direction of the vehicle.

It may be difficult to provide optimal lighting in the headlamps of a vehicle according to a traveling state of the vehicle or road conditions, for example, a traveling speed of the vehicle, a traveling direction, a road state, ambient brightness, etc. Therefore, an adaptive front lighting system that converts an illumination pattern according to the traveling state of a vehicle has recently been proposed. In the adaptive front lighting system, illumination patterns are adaptively converted according to the traveling state by varying cutoff patterns of light generated from a light source. The adaptive front lighting system mainly converts the pattern of a low beam and on motorways, the system usually converts the pattern of a high beam.

To drive a vehicle at night, a driver may turn on either a low beam or a high beam. When the low beam is used, the illumination pattern of the low beam is converted by the adaptive front lighting system and when the high beam is used, the illumination pattern of the high beam is converted according to the presence of a vehicle in front of the subject vehicle.

SUMMARY OF THE INVENTION

The present invention provides an apparatus and a method for controlling a head lamp of a vehicle, that may determine whether the beam irradiated from the head lamp of the vehicle is a low beam or a high beam and may form an illumination pattern corresponding to the irradiated beam.

The above and other objects of the present invention will be described in or be apparent from the following description of the preferred embodiments.

According to an aspect of the present invention, an apparatus is disclosed for controlling a head lamp of a vehicle, the apparatus including one or more processors configured to: determine whether at least one of a low beam and a high beam is turned on; select at least one of a plurality of control information for controlling an illumination pattern according to the determined beam; and control the illumination pattern according to the selected control information.

According to another aspect of the present invention, a method is disclosed for controlling a head lamp of a vehicle, the method including determining, by one or more processors, whether at least one of a low beam and a high beam is turned on; selecting, by one or more processors, at least one of a plurality of control information for controlling an illumination pattern according to the determined beam; and controlling, by one or more processors the illumination pattern according to the selected control information.

As described above, in the apparatus and method for controlling a head lamp of a vehicle, it is determined whether the beam irradiated from the head lamp of the vehicle is a high beam or a low beam and an illumination pattern is formed according to the determined irradiated beam, thereby providing driving environments more convenient to drivers.

BRIEF DESCRIPTION OF THE DRAWINGS

The above and other objects, features and advantages of the present invention will now be more clearly understood from the following detailed description taken in conjunction with the accompanying drawings in which.

DESCRIPTION OF PREFERRED EMBODIMENTS

Figure 1:
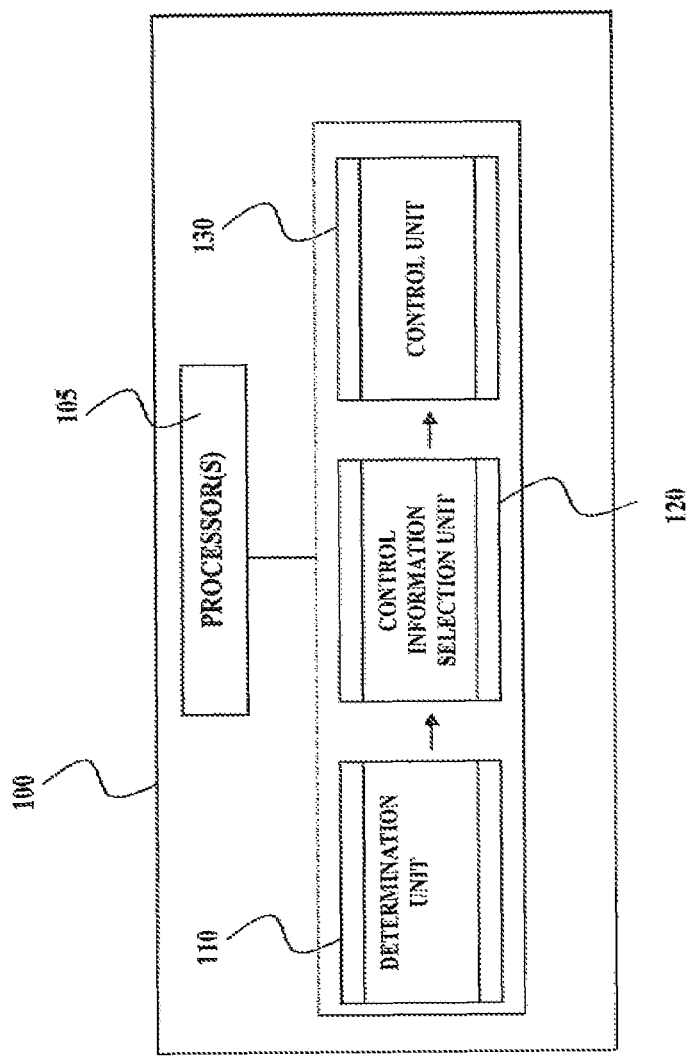
FIG. 1 is an exemplary block diagram of an apparatus for controlling a head lamp of a vehicle according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided for this disclosure to be thorough and complete and will fully convey the concept of the invention to those skilled in the art, and the present invention will only be defined by the appended claims.

Thus, in some embodiments, well-known structures and devices are not shown in order not to obscure the description of the invention with unnecessary detail. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although the below exemplary embodiments are described as using a plurality of units to perform the above process, it is understood that the above processes may also be performed by a single controller or unit. Additionally, it is well understood that a single controller or a plurality of controllers may be utilized to execute each of the above described units. Accordingly, these units may be embodied as hardware or software which is executed by a controller or a processor.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Embodiments described herein will be described referring to plan views and/or cross-sectional views by way of exemplary schematic views of the invention. Accordingly, the exemplary views may be modified depending on manufacturing technologies and/or tolerances. Therefore, the embodiments of the invention are not limited to those shown in the views, but include modifications in configuration formed on the basis of manufacturing processes. Moreover, regions exemplified in figures have schematic properties and shapes of regions shown in figures exemplify specific shapes of regions of elements and not limit aspects of the invention.

Hereinafter, an apparatus and a method for controlling a head lamp of a vehicle according to embodiments of the present invention will be described with reference to the accompanying drawings.

FIG. 1 is an exemplary block diagram of an apparatus for controlling a head lamp of a vehicle according to an exemplary embodiment of the present invention.

As shown in FIG. 1, the apparatus 100 for controlling a head lamp of a vehicle, which will be briefly referred to as a vehicle head lamp controlling apparatus, may include a processor executing a plurality of units. The units include a determination unit 110, a control information selection unit 120 and a control unit 130.

The determination unit 110 may determine whether one or more of low and high beams are turned on. Here, the low beam and the high beam may be turned on by driver manipulation or a state of the vehicle or an ambient state of the vehicle, but aspects of the present invention are not limited thereto. When the determination unit 110 determines that one or more of low and high beams are turned on, the control information selection unit 120 may select one or more of a plurality of pieces of control information for controlling the illumination pattern according to the selected control information.

In particular, the control information selection unit 120 may select control information for controlling the illumination pattern when a low beam is turned on or may select control information for controlling the illumination pattern when a high beam is turned on. In one embodiment of the present invention, the control information selection unit 120 may select the control information for controlling the illumination pattern when one of the low and high beams is turned on, but aspects of the present invention are not limited thereto. When the low beam and the high beam are both turned on, the control information selection unit 120 may select both pieces of control information for controlling the illumination patterns. The plurality of pieces of control information that may be selected by the control information selection unit 120 may include a state of a vehicle, an ambient state of the vehicle and position information of the vehicle.

The state of a vehicle may include a traveling speed of the vehicle, a traveling direction, a slope, a road state, ambient brightness, transmission stage, etc., and a plurality of sensors for sensing various vehicle states may be installed in the vehicle.

The ambient state of a vehicle may include positions of vehicles around the subject vehicle. In this embodiment of the present invention, controlling the illumination pattern of a head lamp of a vehicle is described by way of example. Thus, in the following description, the ambient state is a position of a front vehicle positioned in front of the subject vehicle will be described by way of example.

The position information may include geographic information or road information of a location where the vehicle is currently positioned. The geographic information may be understood to indicate that the vehicle is positioned in a town area or a suburban area, and the road information may be understood to indicate that the vehicle is positioned on a city road or a motorway.

In another embodiment of the present invention, the position information is provided from a navigation system installed in the vehicle, but aspects of the present invention are not limited thereto. Furthermore, the position information may be provided from a variety of devices including a global positioning system (GPS).

The control information selection unit 120 may select pertinent control information among the plurality of pieces of control information according to the determined result of the determination unit 110. The respective pieces of control information for controlling illumination patterns of low and high beams may be determined in advance when vehicles are shipped. The control information selection unit 120 may store the control information for controlling illumination patterns of low and high beams and may select the pertinent control information according to the irradiated beam determined by the determination unit 110.

The control information selection unit 120 may store the respective pieces of control information for controlling illumination patterns of low and high beams in storage media (not shown) including cache, RAM, SRAM, DRAM, ROM, PROM, EPROM, EEPROM, flash memory, hard disk drive, and the like. Alternatively, the control information selection unit 120 may receive the respective pieces of control information from an external storage medium (e.g., an optical disk) or a wired/wireless communication medium through an interface for establishing a connection with the wired/wireless communication medium, but aspects of the present invention are not limited thereto.

According to the embodiment of the present invention, when a low beam is turned on, the control information selection unit 120 may select position information for controlling the illumination pattern of the low beam, and when a high beam is turned on, the control information selection unit 120 may select the ambient state for controlling the illumination pattern of the high beam, which will now be described by way of example.

In addition, when both a low beam and a high beam are turned on, the control information selection unit 120 may select both the position information and the ambient state of the vehicle. In this embodiment of the present invention, when the state of the vehicle is not selected by the control information selection unit 120 as the control information, the state of the vehicle is still taken into consideration when the control unit 130 controls the illumination pattern. In particular, even if the control information selection unit 120 does not select the state of the vehicle as the control information, the control unit 130 considers the position information and the ambient state of the vehicle, respectively and optionally considers the state of the vehicle when it controls the illumination patterns of the low beam and the high beam.

Figure 2:
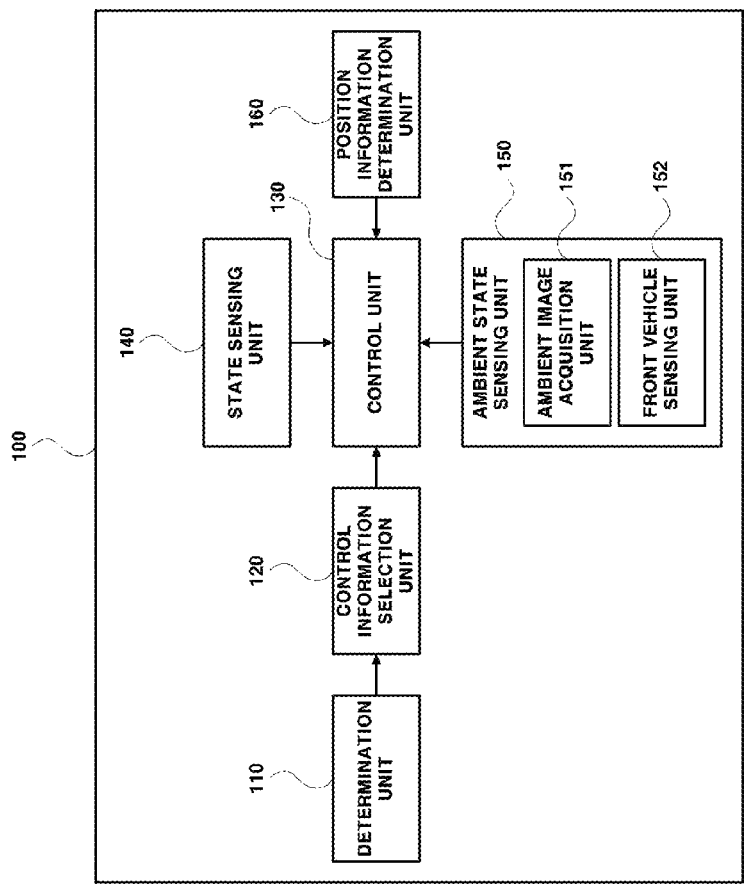
FIG. 2 is an exemplary block diagram of an apparatus for controlling a head lamp of a vehicle according to another exemplary embodiment of the present invention.

To sense the state, the ambient state and the position information of the vehicle, the vehicle head lamp controlling apparatus 100, according to the present invention, may further include a state sensor 140, an ambient state sensor 150 and a position information determination unit 160, as shown in FIG. 2, wherein the position information determination unit is executed by a processor.

The state sensor 140 may detect the state of the vehicle, such as: a traveling speed of the vehicle, a traveling direction, a road state, ambient brightness, and the like. Moreover, the state sensor 140 may include one or more sensors.

The ambient state sensor 150 includes an ambient image acquisition unit 151 and a front vehicle sensor 152. The image acquisition unit 420, executed by a processor, may include one or more cameras acquiring a forward image of the vehicle. The front vehicle sensor 152 may analyze the acquired image to identify whether there is a vehicle in front of the subject vehicle and may sense the position or distance of the front vehicle.

The front vehicle sensor 152 may determine the position of the front vehicle based on the acquired image. For example, the front vehicle sensor 152 may distinguish a preceding vehicle or an oncoming vehicle according to the difference between light wavelengths of a head lamp and a tail lamp. Alternatively, the front vehicle sensor 152 may distinguish a preceding vehicle or an oncoming vehicle based on the position of the central line in the acquired image. Furthermore, the acquired image may include light generated from other light sources such as street lights and neon signs in addition to the head lamp or tail lamp. Accordingly, the front vehicle sensor 152 may identify the vehicle by light between boundary points of the left and right roads in the image information. In addition, the front vehicle sensor 152 may identify the head lamp or tail lamp when there is a pair of lights with similar illumination intensities and illumination patterns.

Additionally, the front vehicle sensor 152 may sense a distance between the subject vehicle and the front vehicle based on the size of the front vehicle included in the acquired image. Alternatively, the front vehicle sensor 152 may detect the distance between a pair of light sources, or may store data of the distance between the subject vehicle and the front vehicle based on the size of the front vehicle or data of the distance between the subject vehicle and the front vehicle based on the distance between a pair of light sources of the front vehicle in an embedded memory or a separate storage medium.

Moreover, to sense the distance between the subject vehicle and the front vehicle, the front vehicle sensor 152 may use the image obtained from the ambient image acquisition unit 151, an infrared sensor, an ultrasonic sensor or radar. The control unit 130 may determine the position of the front vehicle or the distance between the subject vehicle and the front vehicle based on an image sensing result of the front vehicle sensor 152 or a sensing result of the sensor.

Figure 3:
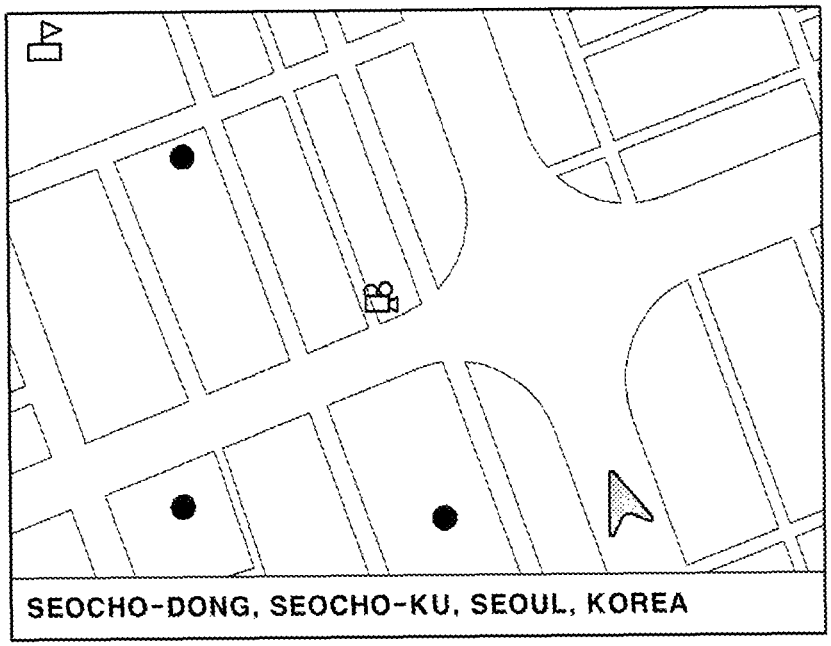
FIG. 3 is an exemplary diagram of a vehicle positioned in a town area according to an exemplary embodiment of the present invention.
Figure 4:
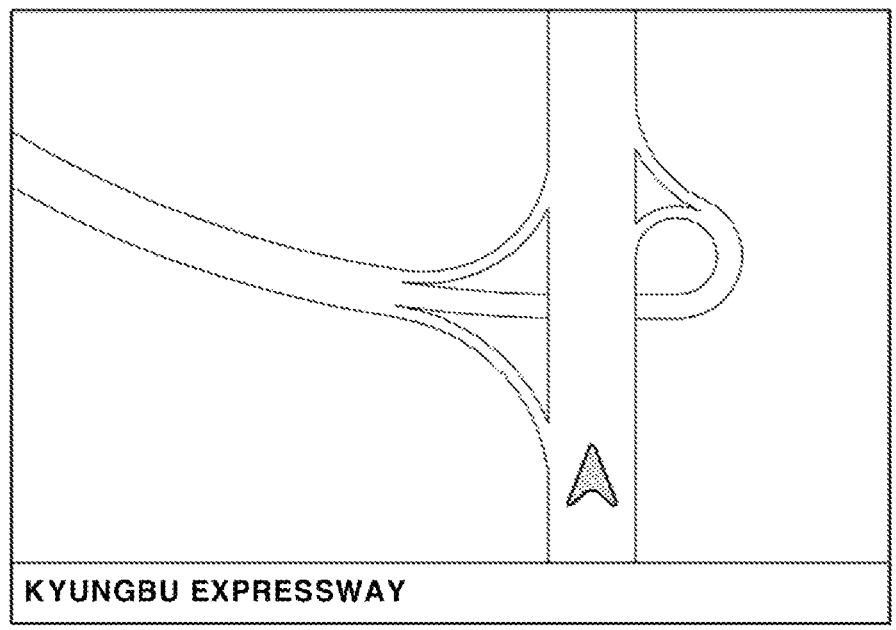
FIG. 4 is an exemplary diagram of a vehicle positioned on a motorway according to an exemplary embodiment of the present invention.

The position information determination unit 160 may determine the current position of the vehicle, such as: geographic information or road information. In one embodiment of the present invention, the position information determination unit 160 may determine the position of the vehicle based on the information from a navigation system installed in the vehicle. The navigation system installed in the vehicle may provide geographic information of a vehicle positioned in a town area, for example, "Seocho-dong, Seocho-ku, Seoul, Korea," as shown in FIG. 3, or road information of a vehicle positioned in a motorway, for example, "Kyungbu Expressway," as shown in FIG. 4. Therefore, as shown in FIGS. 3 and 4, the position information determination unit 160 may determine the position of the vehicle based on the geographic information or road information from the navigation system. The position of the vehicle may be determined by a variety of devices including a global positioning system (GPS) in addition to the navigation system.

The low beam irradiates light to a relatively close area, compared to the high beam. The low beam may irradiate light having an appropriate illumination pattern according to the traveling speed of the vehicle, the traveling direction, the road state, or the ambient brightness.

Figure 5:
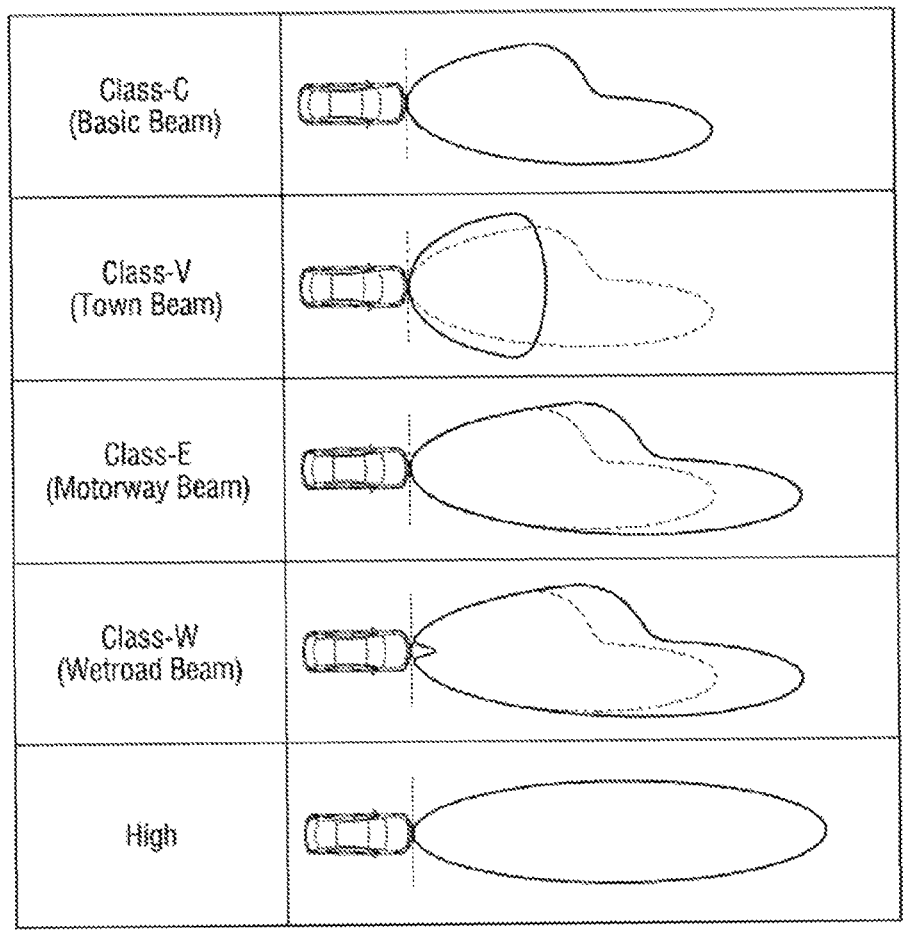
FIG. 5 illustrates exemplary illumination patterns according to an exemplary embodiment of the present invention.

In the present invention, illumination patterns of the low beam may include Class-C, Class-V, Class-E, and Class-W. FIG. 5 illustrates illumination patterns of low and high beams. The illumination pattern of the low beam will now be described.

Class-C is a basic illumination pattern suitably employed when the vehicle travels on a country road or when a driving environment is normal without the need of employing another illumination pattern. Class-V is an illumination pattern suitably employed when the vehicle travels in an environment where a predetermined level or higher of ambient brightness is ensured, such as in a town area. Class-E is an illumination pattern suitably employed when the vehicle travels on a motorway or a road having a substantially long and substantially linear section. Class-W is an illumination pattern suitably employed when the vehicle travels on a wet road such as in rainy weather.

The control information selection unit 120 may identify whether the vehicle is positioned in a town area or a suburban area or on a city road or a motorway based on the position information of the vehicle and may select control information corresponding to the position of the vehicle. In particular, separate information for each road indicating whether the road is positioned in a town area or a suburban area is preferably provided. When the control information, selected by the control information selection unit 120, is position information of the vehicle, the control unit 130 may control the illumination pattern of a low beam. For example, when the vehicle is positioned in a town area, the control unit 130 may form a Class-V illumination pattern, and when the vehicle is positioned on a motorway, the control unit 130 may form a Class-E illumination pattern.

In another embodiment of the present invention, when the position information is provided from the navigation system installed in the vehicle the state of a front or oncoming road ahead with respect to the traveling direction of the vehicle, for example, a curved road, an intersection or a crossroad, may be identified and the control unit 130 may control the illumination pattern according to the front or oncoming road state.

For example, when there is a curved road in a forward direction of the subject vehicle, the control unit 130 may ensure a driver's view by rotating a head lamp on the curved road. When there is a crossroad in a forward direction of the subject vehicle, the control unit 130 may ensure a driver's view by rotating beam irradiation directions of left and right head lamps on the crossroad.

Figure 6:
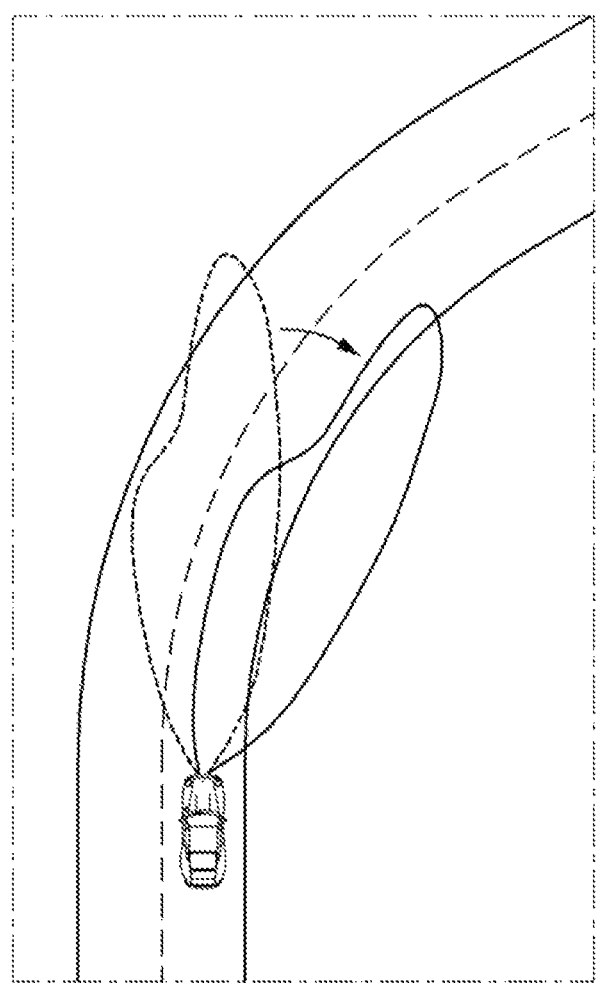
FIG. 6 illustrates exemplary beam irradiation directions changed on a curved road according to an exemplary embodiment of the present invention.

FIG. 6 illustrates beam irradiation directions changed on a curved road according to an embodiment of the present invention. Specifically, FIG. 6 illustrates a road curved to the right side. As shown in FIG. 6, the control unit 130 may determine a beam irradiation direction of a head lamp directed forward on a linear road and may adjust the beam irradiation direction by rotating the head lamp to the curve direction of the road when the vehicle reaches the curved road.

In addition, when the driver sets a destination route on a navigation system, the control unit 130 may control the illumination pattern or beam irradiation direction according to the previously known route of the vehicle.

Figure 7:
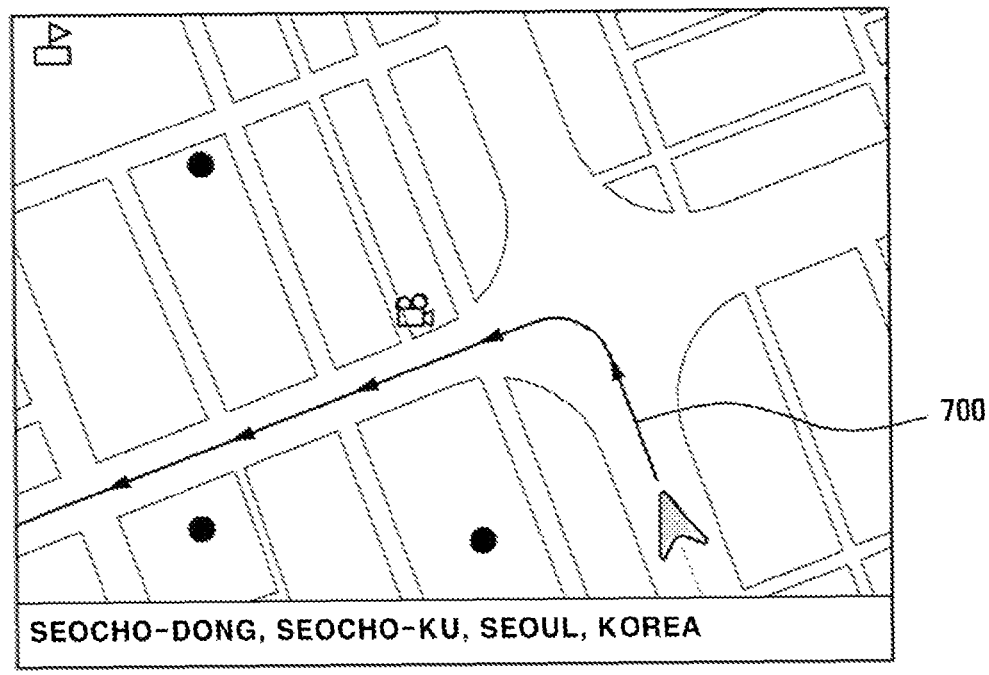
FIG. 7 is an exemplary diagram illustrating the route of a vehicle according to an exemplary embodiment of the present invention.

FIG. 7 is an exemplary diagram illustrating the route of a vehicle according to an exemplary embodiment of the present invention. Specifically, FIG. 7 illustrates a screen of a navigation system in which the moving direction of the vehicle is changed according to the set route.

As described above, the navigation system may be aware of the vehicle's route 700 and may transmit the route to the control unit 130 and the control unit 130 may identify in advance that the oncoming vehicle will make a left turn at an intersection. Therefore, the control unit 130 may determine that the head lamp be directed forward until the vehicle enters the intersection, and once the vehicle enters the intersection, the control unit 130 may adjust the beam irradiation direction to be directed to the left side by rotating the head lamp. Moreover, the control unit 130 may adjust the beam irradiation direction in substantially small movements on a real-time basis to display the upcoming route of the vehicle, instead of simply rotating the beam irradiation direction one time.

Meanwhile, when a high beam is turned on, a wider field of view may be ensured, compared when a low beam is turned on. However, the high beam may cause glare to a driver of a preceding vehicle or an oncoming vehicle in an opposite lane. Therefore, the control unit 130 may determine the position of a vehicle in front of the subject vehicle with respect to a traveling direction of the vehicle and may form a shadow zone corresponding to the determined position of the front vehicle, thereby preventing glare to the driver of the front vehicle.

Figure 8:
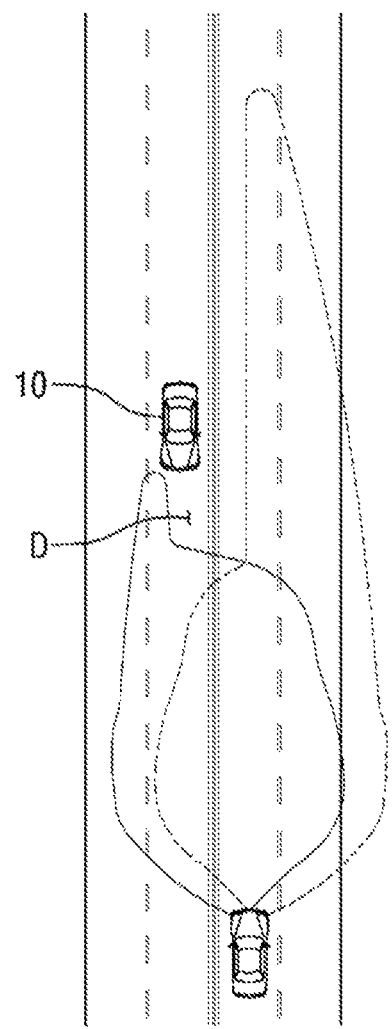
FIG. 8 illustrates exemplary illumination patterns based on the shield in a high beam according to an exemplary embodiment of the present invention.
Figure 9:
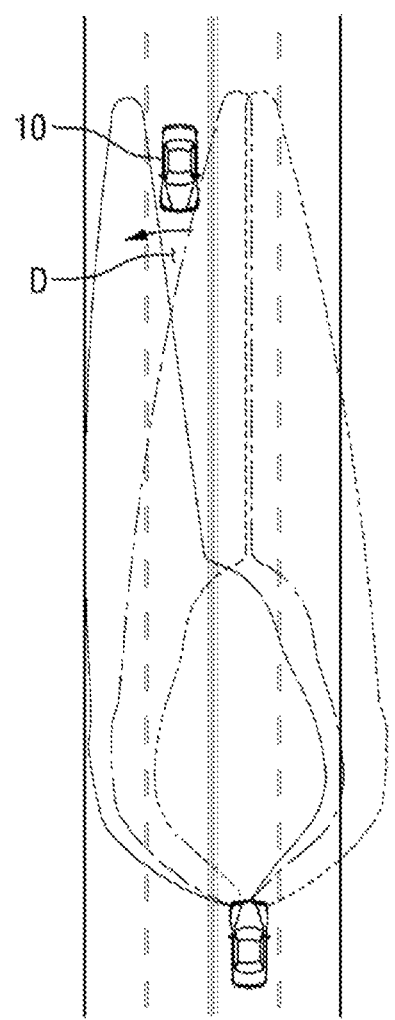
FIG. 9 illustrates exemplary illumination patterns based on the rotation of a head lamp in a high beam according to an exemplary embodiment of the present invention.

For example, when there is a front vehicle (e.g., a preceding vehicle or an oncoming vehicle), the control unit 130 may adjust the beam irradiation distance of the high beam according to the position of the front vehicle or may form a shadow zone D by adjusting the beam irradiation direction. In particular, the control unit 130 may determine the position of a front vehicle 10, and may form the shadow zone D by adjusting the beam irradiation distance when the front vehicle 10 exists, as shown in FIG. 8, or by adjusting the beam irradiation direction, as shown in FIG. 9.

When the low beam or the high beam is turned on, a head lamp 600 controls the illumination pattern as follows, which will now be described with reference to FIG. 10.

Figure 10:
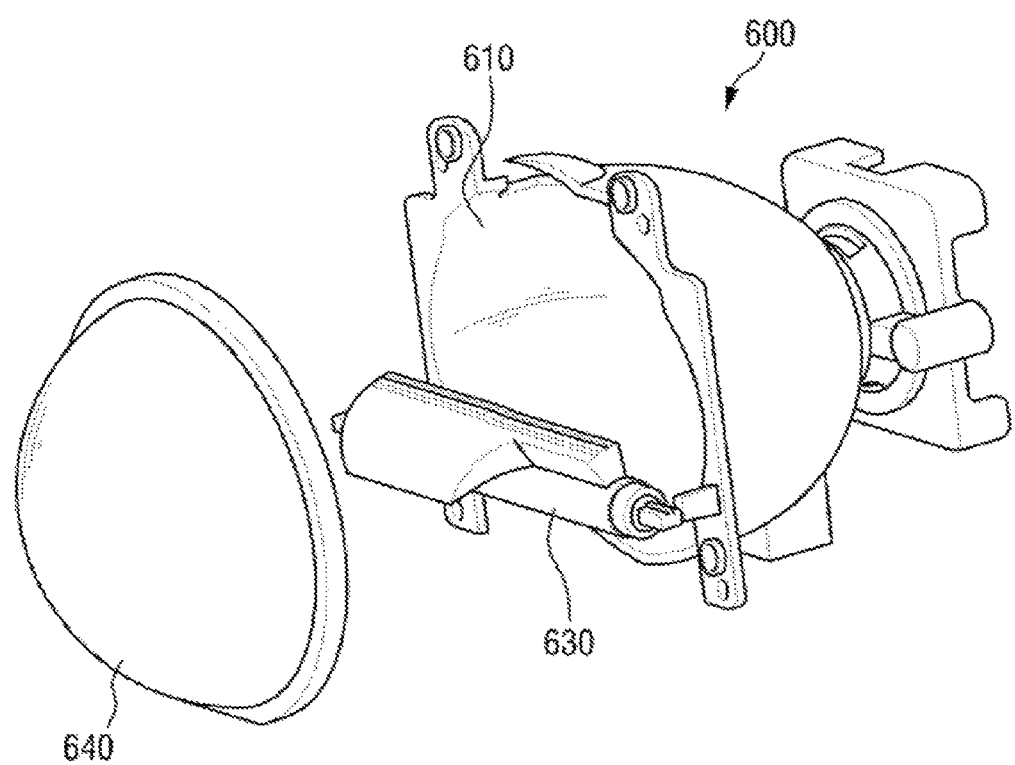
FIG. 10 is an exemplary view of a head lamp according to an exemplary embodiment of the present invention.
Figure 11:
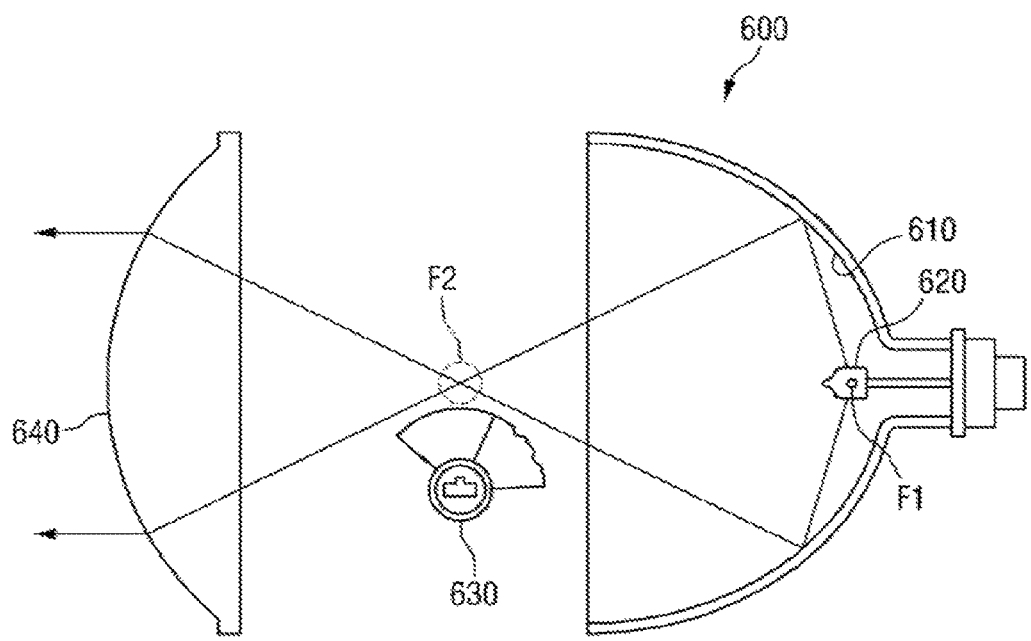
FIG. 11 is an exemplary side view of a head lamp according to an exemplary embodiment of the present invention.

FIG. 10 is an exemplary view of a head lamp according to an exemplary embodiment of the present invention and FIG. 11 is an exemplary side view of a head lamp according to an exemplary embodiment of the present invention.

As shown in FIGS. 10 and 11, the head lamp 600, according to an embodiment of the present invention, may include: a reflector 610; a light source 620 disposed around a first focus F1 of the reflector 61; a shield 630 disposed around a second focus F2 of the reflector 610 and shielding some of the light emitted from the light source 620 to form an illumination pattern; and a lens 640 irradiating the light of the illumination pattern formed by the shield 630. In one embodiment of the present invention, the light source 620 may include: a halogen lamp, a high intensity discharge lamp, or a light emitting diode, but not limited thereto.

Figure 12:
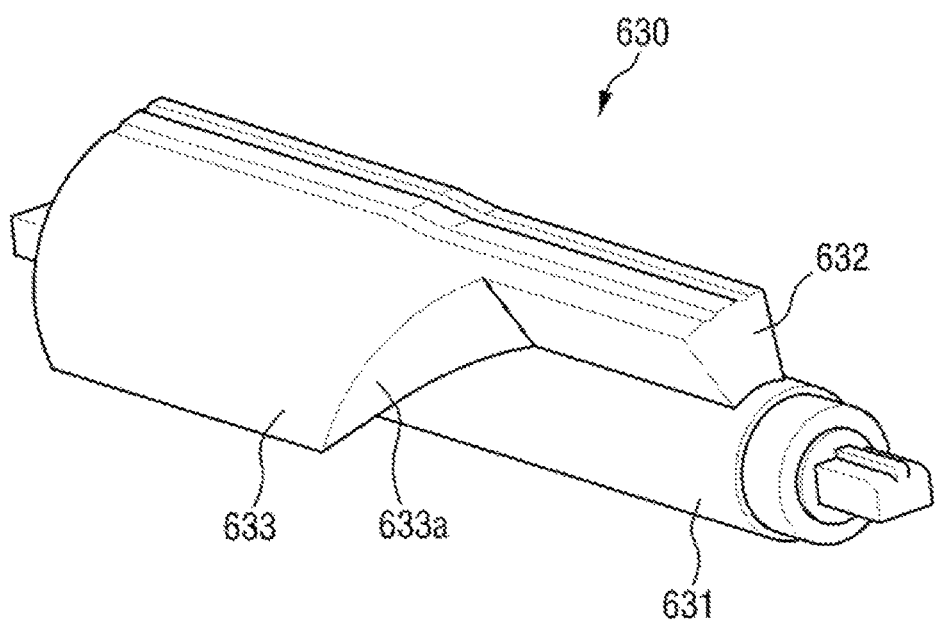
FIG. 12 is an exemplary view of a shield according to an exemplary embodiment of the present invention.

FIG. 12 is an exemplary view of a shield according to an exemplary embodiment of the present invention.

As shown in FIG. 12, the shield 630 may include a first shield 632 formed in a direction of a rotation axis of a rotatable body 631 and a plurality of shield protrusions formed by an illumination pattern when a low beam is turned on, and a second shield 633 forming a shadow zone according to the position of a front vehicle when a high beam is turned on. The body 631 disposed at one side of the second shield 633 may form a high illumination pattern for ensuring a wide field of view when a distance between the front vehicle and the body 631 exceeds a predetermined distance or when there is no front vehicle. The first shield 632 may include different cut-off patterns, i.e., topmost sections, according to the respective illumination patterns, and the second shield 633 may include a step portion 633a extending from the center of the body 631 to one end of the body 631 to form a shadow zone according to the position of the front vehicle.

It should be understood that the Class-C, Class-V, Class-E, and Class-W illumination patterns, among the illumination patterns shown in FIG. 5, are formed by the first shield 632 and the high illumination pattern is formed by a portion without the first shield 632 and the second shield 633. It should also be understood that the illumination patterns shown in FIGS. 8 and 9 are formed by the second shield 633.

Figure 13:
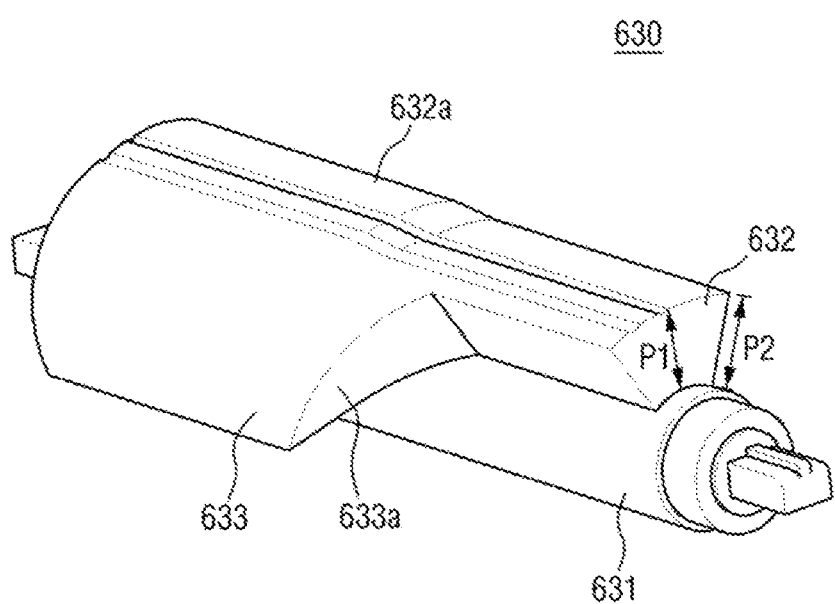
FIG. 13 is an exemplary view of a shield according to another exemplary embodiment of the present invention.

Furthermore, as shown in FIG. 13, one or more of the plurality of shield protrusions included in the first shield 632 may extend in varying heights in a direction in which the body 631 rotates, and may adjust a beam irradiation distance according to the position of the front vehicle even when a low beam is turned on. In particular, assuming that a height of one surface of the extended shield protrusion 632a is denoted by P1, a height of the other surface of the extended shield protrusion 632a is denoted by P2, and P1 is smaller than P2, the beam irradiation distance becomes longer away from P2 to P1, and vice versa. Therefore, when the extended shield protrusion 632a forms a Class-C illumination pattern, an arbitrary point between P1 and P2 is positioned around the second focus F2 even in a state in which the illumination pattern is changed to a Class-C illumination pattern, thereby adjusting the beam irradiation distance.

Figure 14:
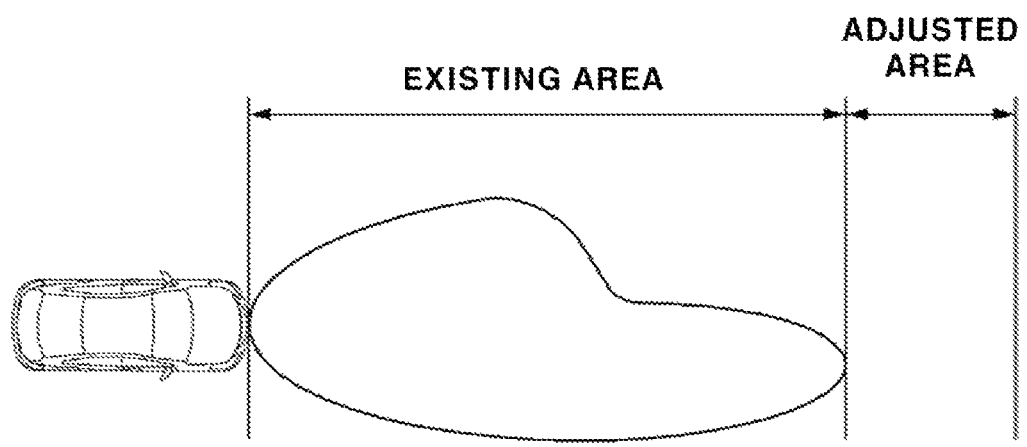
FIGS. 14 and 15 illustrate exemplary adjusted areas in a beam irradiation distance according to an exemplary embodiment of the present invention.
Figure 15:
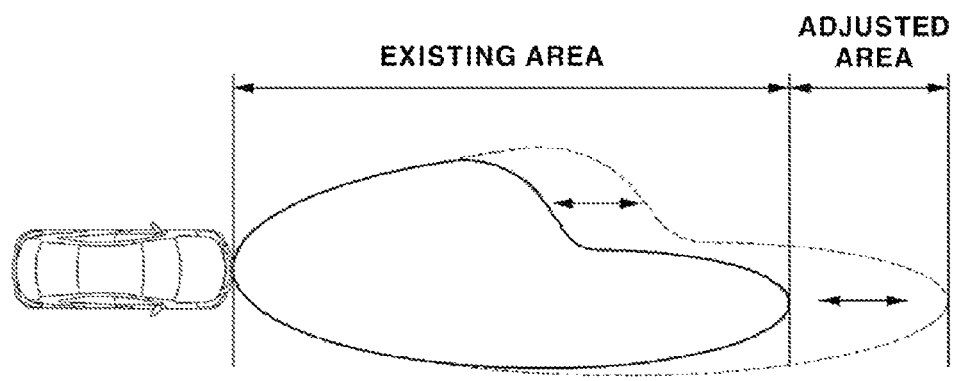

Accordingly, assuming that P2 in FIG. 13 corresponds to an existing beam irradiation distance, a beam may be irradiated into an existing area by the shield protrusion having the height P2, as shown in FIG. 14, and the height of the shield protrusion may be reduced away from P2 to P1, the beam irradiation distance may be adjusted within an adjusted area, as shown in FIG. 15.

As described above, when there is a front vehicle (e.g., a preceding vehicle or an oncoming vehicle), the beam irradiation distance may be adjusted according to the position or distance of the front vehicle. Therefore, when a distance from the subject vehicle and the front vehicle is reduced, a glare may be prevented from being caused to the front vehicle, and when a distance from the subject vehicle and the front vehicle is increased, a sufficiently wide field of view may be ensured.

In the foregoing description, when the extended shield protrusion 632a of the present invention is formed of a continuous surface has been described by way of example, which is, however, provided only for a better understanding of the present invention, but aspects of the present invention are not limited thereto. The plurality of shield protrusions may be arranged stepwise.

Figure 16:
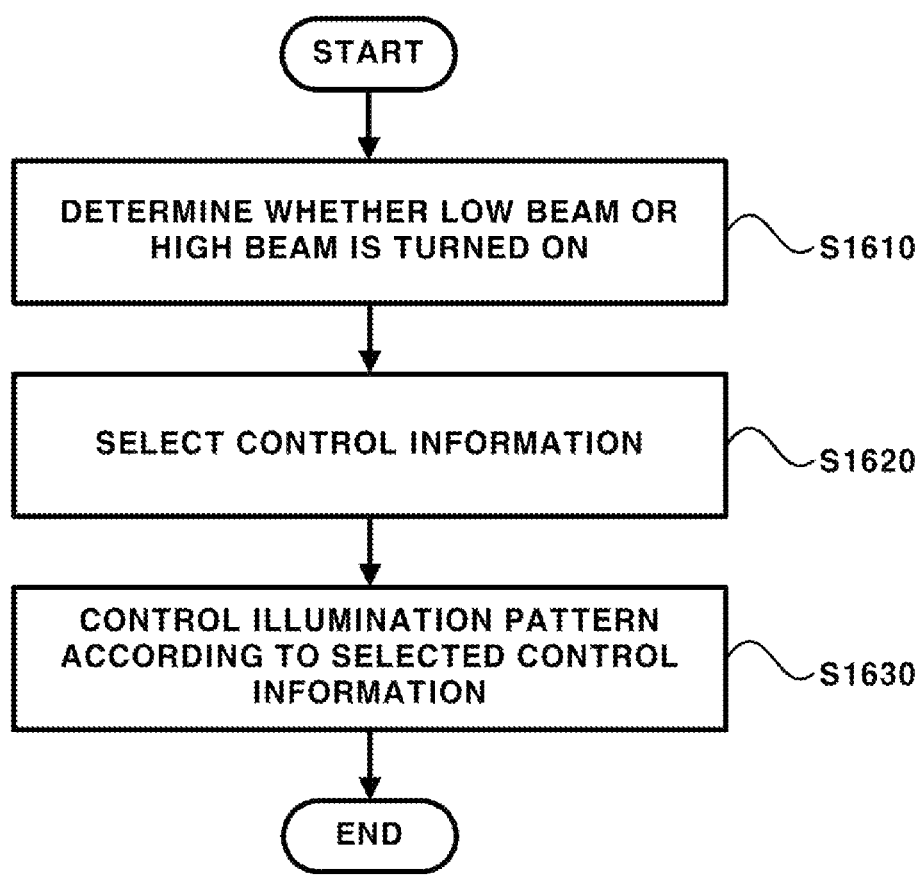
FIG. 16 is an exemplary flow chart illustrating a head lamp controlling process in a method for controlling a head lamp of a vehicle according to an exemplary embodiment of the present invention.

FIG. 16 is an exemplary flow chart illustrating a head lamp controlling process in a method for controlling a head lamp of a vehicle according to an exemplary embodiment of the present invention.

While the vehicle is traveling, a determination unit 110 may determine whether at least one of a low beam and a high beam is turned on (S1610). In particular, the determination unit 110 may determine whether the beam based on the head lamp is a low beam or a high beam or whether both of the low beam and the high beam are turned on.

The beam determined by the determination unit 110 may be transmitted to the control information selection unit 120. The control information selection unit 120 may selection at least one of a plurality of pieces of control information according to the determination result (S1620). For example, when the received determination result indicates that a low beam is turned on, the control information selection unit 120 may select control information corresponding to the low beam. When the received determination result indicates that a high beam is turned on, the control information selection unit 120 may select control information corresponding to the high beam. When the received determination result indicates that both of a low beam and a high beam are turned on, the control information selection unit 120 may select pieces of control information corresponding to both of the low beam and the high beam.

Furthermore, the control information selected by the control information selection unit 120 may include a state of a vehicle, an ambient state of the vehicle and position information of the vehicle. When the received determination result indicates that a low beam is turned on, the control information selection unit 120 may select the position information of the vehicle as the control information. When the received determination result indicates that a high beam is turned on, the control information selection unit 120 may select the ambient state of the vehicle as the control information. When the received determination result indicates that both of a low beam and a high beam are turned on, the control information selection unit 120 may select both of the position information and the ambient state of the vehicle as the control information.

The control information selected by the control information selection unit 120 may be transmitted to the control unit 130. The control unit 130 may control the illumination pattern based on the received control information (S1630). For example, when the received control information includes the position information of the vehicle, the low beam is turned on. In particular, the control unit 130 may rotate the shield 630 to form one of Class-C, Class-V, Class-E and Class-W illumination patterns based on the position information of the vehicle. When the received control information includes the ambient state of the vehicle, the high beam is turned on. In particular, the control unit 130 may form a shadow zone by adjusting a beam irradiation distance based on the ambient state of the vehicle or by adjusting a beam irradiation direction. To form an illumination pattern according to the control information received, the control unit 130 may use position information provided from a navigation system or a GPS or image information provided from the ambient state sensor 150.

Moreover, when the low beam is turned on, the control unit 130 may form the illumination pattern by considering only the position information. When the high beam is turned on, the control unit 130 may form the illumination pattern by considering only the image information. In such a manner, the illumination pattern may be controlled by taking only necessary information into consideration, thereby reducing the computation quantity of the control unit 130 and enabling rapid processing.

While the present invention has been particularly shown and described with reference to exemplary embodiments thereof, it will be understood by those of ordinary skill in the art that various modifications, additions and substitutions are possible without departing from the spirit and scope of the present invention as disclosed in the accompanying claims. It is therefore desired that the present embodiments be considered in all respects as illustrative and not restrictive, reference being made to the appended claims rather than the foregoing description to indicate the scope of the invention.

What is claimed is:

1. An apparatus for controlling a head lamp of a vehicle, the apparatus comprising:
    one or more processors configured to:
    determine whether at least one of a low beam and a high beam is turned on;
    select at least one of a plurality of pieces of control information for controlling an illumination pattern in response to the determination result;
    control the illumination pattern in response to the selected control information;
    select position information of the vehicle as the control information in response to determining that the low beam is turned on; and
    select an ambient state of the vehicle as the control information in response to determining that the high beam is turned on.

2. The apparatus of claim 1, wherein the control information is selected from a group consisting of at least one of: a state of a vehicle; an ambient state of the vehicle and position information of the vehicle.

3. The apparatus of claim 2, the one or more processors are further configured to:
   detect the state of the vehicle using one or more sensors;
   determine position information of the vehicle; and
   detect the ambient state of the vehicle,
   wherein detecting the ambient state of the vehicle includes acquiring a front image of the vehicle; and detecting a position of a front vehicle based on the acquired front image.

4. The apparatus of claim 2, wherein the position information of the vehicle is obtained from a navigation system installed in the vehicle.

5. The apparatus of claim 2, wherein the position information of the vehicle includes at least one of geographic information of the vehicle and road information.

6. The apparatus of claim 2, wherein the one or more processors are configured to control the illumination pattern in response to the position information of the vehicle selected as the control information and optionally in response to the state of the vehicle.

7. The apparatus of claim 2, wherein the ambient state of the vehicle includes a position of a front vehicle positioned in a forward direction with respect to a traveling direction of the vehicle.

8. The apparatus of claim 7, wherein the one or more processors are configured to control the illumination pattern in response to the ambient state of the vehicle selected as the control information and optionally in response to the state of the vehicle.

9. A method for controlling a head lamp of a vehicle, the method comprising:
   determining, by the one or more processors, whether at least one of a low beam and a high beam is turned on;
   selecting, by the one or more processors, at least one of a plurality of pieces of control information for controlling an illumination pattern according to the determination result;
   controlling, by the one or more processors, the illumination pattern in response to the selected control information;
   selecting, by the one or more processors, position information of the vehicle as the control information in response to determining that the low beam is turn on; and
   selecting, by the one or more processors, an ambient state of the vehicle as the control information in response to determining that the high beam is turned on.

10. The method of claim 9, wherein the control information is selected from a group consisting of at least one of: a state of a vehicle, an ambient state of the vehicle and position information of the vehicle.

11. The method of claim 10, further comprising:
   sensing, by a state sensor, the state of the vehicle using one or more sensors;
   determining, by the one or more processors, position information of the vehicle; and
   detecting, by an ambient state sensor, the ambient state of the vehicle,
   wherein the detecting of the ambient state includes acquiring, by a camera, a front image of the vehicle and detecting, by a front vehicle sensor, a position of the front vehicle based on the acquired front image.

12. The method of claim 10, wherein the ambient state of the vehicle includes a position of a front vehicle positioned in a forward direction with respect to a traveling direction of the vehicle.

13. The method of claim 12, wherein the controlling of the illumination pattern comprises controlling, by the one or more processors, the illumination pattern in response to the ambient state of the vehicle selected as the control information and optionally in response to the state of the vehicle.

14. The method of claim 10, wherein the position information of the vehicle is obtained from a navigation system installed in the vehicle.

15. The method of claim 10, wherein the position information of the vehicle includes at least one of geographic information of the vehicle and road information.

16. The method of claim 10, wherein the controlling of the illumination pattern comprises controlling, the by one or more processors, the illumination pattern in response to the position information of the vehicle selected as the control information and optionally in response to the state of the vehicle.

17. A non-transitory computer readable medium containing program instructions executed by a processor, the computer readable medium comprising:
   program instructions that instruct a controller to determine whether at least one of a low beam and a high beam is turned on;
   program instructions that instruct a controller to select at least one of a plurality of pieces of control information for controlling an illumination pattern according to the determination result;
   program instructions that instruct a controller to control the illumination pattern according to the selected control information;
   program instructions that select position information of the vehicle as the control information in response to determining that the low beam is turn on; and
   program instructions that select an ambient state of the vehicle as the control information in response to determining that the high beam is turned on.

18. The non-transitory computer readable medium of claim 17, wherein the position information includes at least one of geographic information of the vehicle and road information.

19. The non-transitory computer readable medium of claim 17, wherein the ambient state of the vehicle includes a position of a front vehicle positioned in a forward direction with respect to a traveling direction of the vehicle.

20. The non-transitory computer readable medium of claim 17, further comprising:
   program instructions that instruct a state sensor to detect the state of the vehicle using one or more sensors;
   program instructions that instruct a controller to determine position information of the vehicle; and
   program instructions that instruct an ambient state sensor to detect the ambient state of the vehicle,
   wherein to detect the ambient state includes to acquire, by a camera, a front image of the vehicle and detect a position of the front vehicle based on the acquired front image.

* * * * *